US012699695B2

(12) United States Patent
McGuire et al.

(10) Patent No.: US 12,699,695 B2
(45) Date of Patent: Aug. 4, 2026

(54) SEARCHING FOR AND RETRIEVING THREE-DIMENSIONAL (3D) VIRTUAL OBJECTS

(71) Applicant: Roblox Corporation, San Mateo, CA (US)

(72) Inventors: Morgan Samuel McGuire, Waterloo (CA); Hsueh-Ti Derek Liu, Vancouver (CA); Victor B. Zordan, Riverside, CA (US)

(73) Assignee: Roblox Corporation, San Mateo, CA (US)

( * ) Notice: Subject to any disclaimer, the term of this patent is extended or adjusted under 35 U.S.C. 154(b) by 0 days.

(21) Appl. No.: 18/591,706

(22) Filed: Feb. 29, 2024

(65) Prior Publication Data

US 2025/0278402 A1     Sep. 4, 2025

(51) Int. Cl.
*G06F 16/2453* (2019.01)
*G06F 16/248* (2019.01)

(52) U.S. Cl.
CPC ...... *G06F 16/24534* (2019.01); *G06F 16/248* (2019.01)

(58) Field of Classification Search
CPC .. G06F 16/248; G06F 16/24; G06F 16/24534; G06F 16/2453
See application file for complete search history.

(56) References Cited

U.S. PATENT DOCUMENTS

| | | | | |
|---|---|---|---|---|
| 2015/0178321 A1* | 6/2015 | Rivlin | ........... | G06F 16/532 |
| | | | | 707/728 |
| 2015/0339348 A1* | 11/2015 | Joo | ........... | G06F 16/433 |
| | | | | 707/722 |
| 2018/0114190 A1* | 4/2018 | Borrel | ........... | G06N 20/00 |
| 2020/0020133 A1* | 1/2020 | Najaf-Zadeh | ........... | G06T 9/00 |
| 2021/0190664 A1* | 6/2021 | Duke | ........... | G06T 3/4007 |
| 2022/0091723 A1* | 3/2022 | Faulkner | ........... | G06F 3/017 |
| 2022/0257928 A1* | 8/2022 | Kuleshov | ........... | A61N 1/3787 |
| 2022/0301264 A1* | 9/2022 | O'Leary | ........... | G01C 21/3664 |

(Continued)

OTHER PUBLICATIONS

"Alpha Compositing", https://en.wikipedia.org/wiki/Alpha_compositing, Feb. 26, 2024, 7 pages.

(Continued)

*Primary Examiner* — Amy Ng
*Assistant Examiner* — Dustin D Eyers
(74) *Attorney, Agent, or Firm* — IP Spring

(57) ABSTRACT

Some implementations relate to methods, systems, and computer-readable media to search for and retrieve three-dimensional (3D) objects based on user queries. An exemplary method comprises receiving a first query for one or more 3D objects. At least one constraint is identified from the first query, wherein the at least one constraint includes a particular descriptor that specifies one or more aspects of matching 3D objects. A second query is generated comprising a set of descriptors comprising the particular descriptor. A search is then performed, using the second query, to search a data repository containing 3D content, to obtain one or more 3D object search results having features responsive to the first query. A response that includes one or more 3D object search results may then be outputted as a response to the first query.

20 Claims, 7 Drawing Sheets

(56)                References Cited

U.S. PATENT DOCUMENTS

| | | | |
|---|---|---|---|
| 2024/0161403 A1* | 5/2024 | Lin ........................... | G06T 3/40 |
| 2024/0273798 A1* | 8/2024 | Oh ........................... | G06T 17/20 |

OTHER PUBLICATIONS

"CLIP: Connecting text and images", https://openai.com/research/clip, Jan. 5, 2021, 23 pages.

Aditya Sanghi, et al., "CLIP-Sculptor: Zero-Shot Generation of High-Fidelity and Diverse Shapes from Natural Language", arXiv preprint arXiv:2211.01427 (2022). https://arxiv.org/abs/2211.01427, 10 Pages.

Brent Burley, et al., "Physically Based Shading at Disney", SIGGRAPH 2012 Course Notes, https://media.disneyanimation.com/uploads/production/publication_asset/48/asset/s2012_pbs_disney_brdf_notes_v3. pdf, 27 Pages.

Federico Tombari, et al., "Unique Signatures of Histograms for Local Surface Description", Computer Vision—ECCV 2010: 11th European Conference on Computer Vision, Heraklion, Crete, Greece, Sep. 5-11, 2010, Proceedings, Part III 11. Springer Berlin Heidelberg, 2010 http://www.vision.deis.unibo.it/fede/papers/eccv10.pdf.

H. Sundar, et al., "Skeleton Based Shape Matching and Retrieval", 2003 Shape Modeling International . . . IEEE, 2003. http://ai.stanford.edu/~mitul/papers/sundar-skeleton-matching-smi2003.pdf, 10 Pages.

H.G. Barrow, et al., "Parametric Correspondence and Chamfer Matching: Two New Techniques for Image Matching", Proceedings: Image Understanding Workshop. Science Applications, Inc, 1977.—Link: https://www.ijcai.org/Proceedings/77-2/Papers/024.pdf, 10 Pages.

Hang Su, et al., "Multi-view Convolutional Neural Networks for 3D Shape Recognition", Proceedings of the IEEE international conference on computer vision. 2015. https://arxiv.org/pdf/1505.00880.pdf, Sep. 27, 2015, 12 pages.

Huttenlocher, Daniel P., et al., "Comparing images using the Hausdorff distance", IEEE Transactions on pattern analysis and machine intelligence 15.9 (1993): 850-863. https://people.eecs.berkeley.edu/~malik/cs294/Huttenlocher93.pdf, 14 Pages.

Johan WH Tangelder, et al., "A Survey of Content Based 3D Shape Retrieval Methods", Multimedia tools and applications 39 (2008): 441-471.—https://www.cs.princeton.edu/courses/archive/fall06/cos526/tangelder04.pdf, 12 Pages.

Mathias Eitz, et al., "Sketch-Based Shape Retrieval", ACM Transactions on graphics (TOG) 31.4 (2012): 1-10. https://cybertron.cg.tu-berlin.de/eitz/pdf/2012_siggraph_sbsr.pdf, 10 pages.

Michael Kazhdan,, et al., "Rotation Invariant Spherical Harmonic Representation of 3D Shape Descriptors", Eurographics Symposium on Geometry Processing (2003), https://www.cs.jhu.edu/~misha/MyPapers/SGP03.pdf, 9 pages.

Raif M. Rustamov, et al., "Map-Based Exploration of Intrinsic Shape Differences and Variability", ACM Transactions on Graphics (TOG) 32.4 (2013): 1-12. https://citeseerx.ist.psu.edu/document?repid=rep1&type=pdf&doi=63bd0679da02b5923a20f29c5abb4e7e8abafb5f.

Robert Osada, et al., "Shape Distributions", ACM Transactions on Graphics (TOG) 21.4 (2002): 807-832. http://graphics.stanford.edu/courses/cs468-08-fall/pdf/osada.pdf, 26 Pages.

Wikipedia, "CLIP: Connecting text and images", https://en.wikipedia.org/wiki/Alpha_compositing, Jan. 5, 2021, 23 Pages.

Wikipedia, "Alpha Compositing", https://openai.com/research/clip, Feb. 26, 2024, 7 pages.

* cited by examiner

100

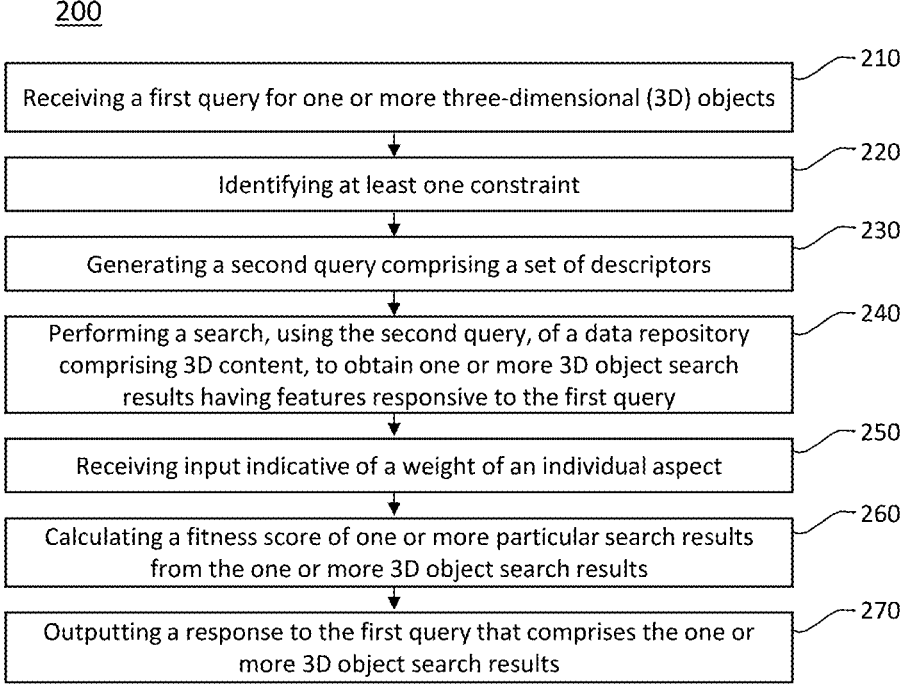

200

Receiving a first query for one or more three-dimensional (3D) objects — 210

Identifying at least one constraint — 220

Generating a second query comprising a set of descriptors — 230

Performing a search, using the second query, of a data repository comprising 3D content, to obtain one or more 3D object search results having features responsive to the first query — 240

Receiving input indicative of a weight of an individual aspect — 250

Calculating a fitness score of one or more particular search results from the one or more 3D object search results — 260

Outputting a response to the first query that comprises the one or more 3D object search results — 270

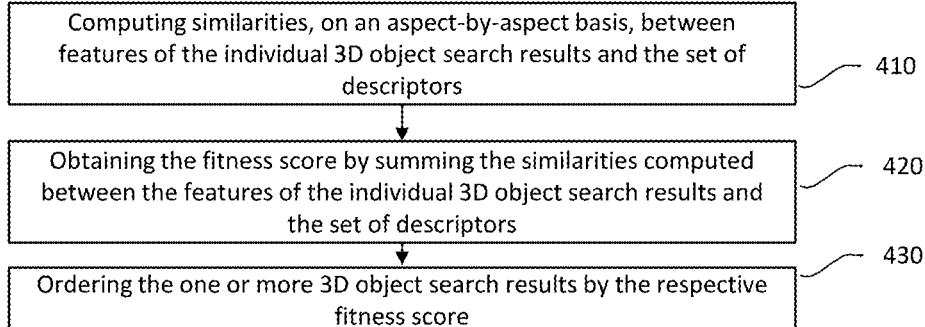

Computing similarities, on an aspect-by-aspect basis, between features of the individual 3D object search results and the set of descriptors ⟋ 410

Obtaining the fitness score by summing the similarities computed between the features of the individual 3D object search results and the set of descriptors ⟋ 420

⟋ 430

Ordering the one or more 3D object search results by the respective fitness score

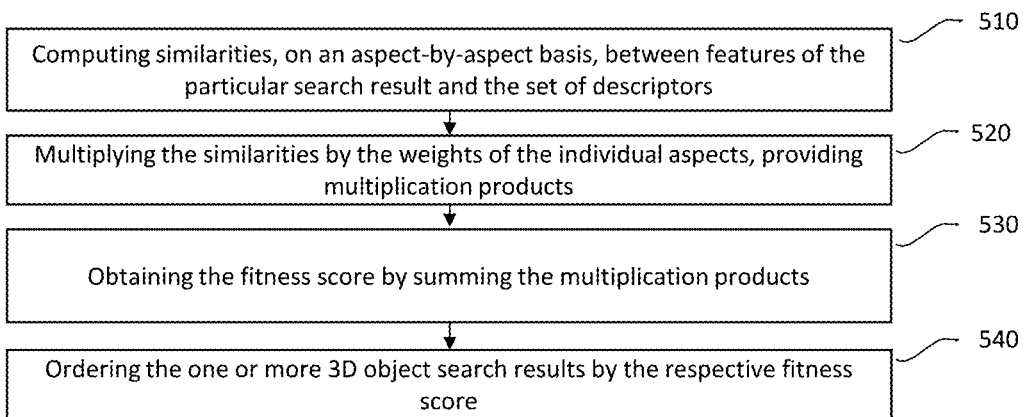

510

Computing similarities, on an aspect-by-aspect basis, between features of the particular search result and the set of descriptors

520

Multiplying the similarities by the weights of the individual aspects, providing multiplication products

530

Obtaining the fitness score by summing the multiplication products

540

Ordering the one or more 3D object search results by the respective fitness score

FIG. 5

600
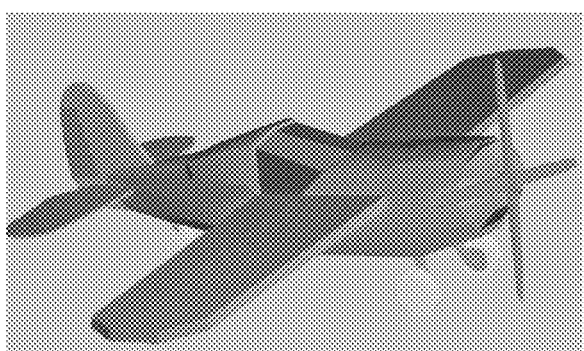
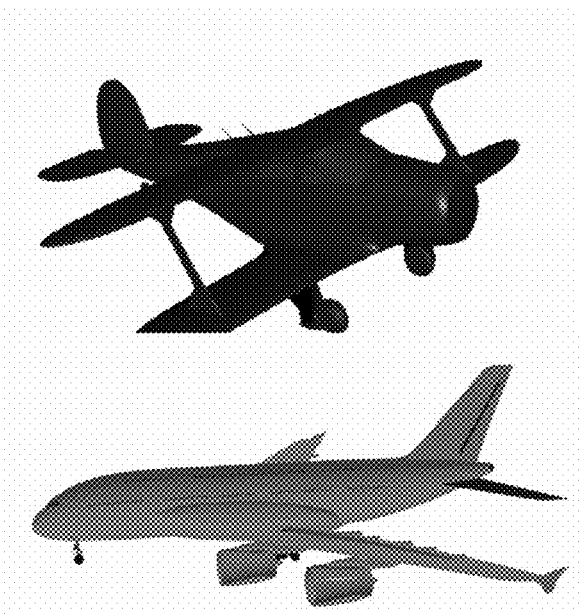
FIG. 6

SEARCHING FOR AND RETRIEVING THREE-DIMENSIONAL (3D) VIRTUAL OBJECTS

TECHNICAL FIELD

Implementations relate generally to searching for and retrieving three-dimensional (3D) objects.

BACKGROUND

Users of three-dimensional (3D) databases such as databases that store various 3D objects can currently only search the manually-entered metadata in the databases to find 3D objects. For example, if a user searches for "red plane," then a solely text-based keyword search is executed on metadata. Objects that have metadata that match the keyword are returned. If the metadata is incorrect or insufficient, objects that match the query may not be returned.

Previous approaches for searching and retrieving three-dimensional (3D) objects have relied on keyword-based queries or manual categorization of objects. These approaches lack the ability to accurately capture the complex and nuanced aspects of 3D objects, resulting in limited search results and user dissatisfaction. Keyword-based queries may not effectively capture the appropriate characteristics or features of the objects, leading to irrelevant search results. Manual categorization, on the other hand, is time-consuming and subjective, relying on human judgment to assign objects to specific categories.

Another approach involves using metadata or tags associated with 3D objects to facilitate search and retrieval. However, this approach is limited by the quality and consistency of the metadata, as well as the ability to accurately assign relevant tags to objects. In many cases, the metadata may be incomplete, inconsistent, or not comprehensive enough to capture the full range of features and characteristics of the 3D objects.

Furthermore, existing techniques for searching and retrieving 3D objects often lack the ability to incorporate user-defined constraints or descriptors. Users may have specific requirements or preferences for the objects they are seeking, such as color, shape, texture, or other visual or structural attributes. However, previous approaches have not provided a comprehensive solution that allows users to specify these constraints or descriptors and obtain accurate and relevant search results based on their preferences.

A search may also take into account non-description text and/or numeric metadata in current 3D search engines. This text and/or metadata may include information about the creation date, license model, author, price, and user quality rating of pieces of 3D content. The search may also include values precomputed from the model itself, such as polygon count, number of skeletal animation bones, and number of texture maps. These various types of information are treated as metadata once computed. The actual 3D asset itself is not queried during the search in any known existing 3D asset management system.

Alternative approaches include solutions for identifying properties of 3D shapes without metadata. For instance, some approaches represent the global shape appearance or local shape appearance as fixed-size vectors for comparison purposes. Other approaches rely on machine learning to encode the rendered appearances.

Once those properties are identified, they become the fundamental building blocks for a 3D geometry search. One approach searches 3D models by comparing the vector representation of global shape appearances. Another approach searches 3D shapes based on 2D sketches. In addition to comparing these properties, some approaches can also directly compare the Euclidean distance between two shapes.

Despite having many 3D search techniques based on different properties, there is no current 3D search system that unifies these beneficial ideas in the art. In the following section, some implementations provide a unified content-based 3D geometry search system. Such a unified content-based 3D geometry search system uses advantages of multiple different alternative approaches in an advantageous way to facilitate searching for 3D assets.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations described herein relate to searching for and retrieving three-dimensional (3D) objects.

According to one aspect, a computer-implemented method comprises: receiving a first query for one or more three-dimensional (3D) objects; identifying at least one constraint from the first query, wherein the at least one constraint comprises a particular descriptor that specifies one or more aspects of matching 3D objects; generating a second query comprising a set of descriptors, the set of descriptors comprising the particular descriptor; performing a search, using the second query, of a data repository comprising 3D content, to obtain one or more 3D object search results having features responsive to the first query; and outputting a response to the first query that comprises the one or more 3D object search results.

Various implementations of the computer-implemented method are described herein.

In some implementations, the identifying the at least one constraint from the first query comprises: parsing the first query to extract the particular descriptor; and determining the one or more aspects specified by the particular descriptor.

In some implementations the one or more aspects specified in the particular descriptor comprise one or more of geometry, material, articulation, animation, or at least one of physical models or simulation.

In some implementations, the particular descriptor further specifies a region.

In some implementations, the particular descriptor is associated with a particular aspect within the region.

In some implementations, the region describes a volume of space relative to a bounding volume, a convex hull, or surface of a 3D object.

In some implementations, the region describes an area of the 3D objects.

In some implementations, the computer-implemented method further comprises: calculating a fitness score of individual search results of the one or more 3D object search results by: computing similarities, on an aspect-by-aspect basis, between features of the individual 3D object search results and the set of descriptors; and obtaining the fitness score by summing the similarities computed between the features of the individual 3D object search results and the set of descriptors.

In some implementations, the computer-implemented method further comprises: receiving input indicative of weight of individual aspects of the one or more aspects; and calculating a fitness score of a particular search result from the one or more 3D object search results by: computing similarities, on an aspect-by-aspect basis, between features of the particular search result and the set of descriptors; multiplying the similarities by the weights of the individual aspect, providing multiplication products; and obtaining the fitness score by summing the multiplication products.

In some implementations, the outputting the response to the first query comprises: ordering the one or more 3D object search results by the respective fitness score, wherein the response comprises a subset of the one or more 3D object search results.

According to another aspect, a system is disclosed, comprising: a memory with instructions stored thereon; and a processing device, coupled to the memory, the processing device configured to access the memory and execute the instructions, wherein the instructions cause the processing device to perform operations comprising: receiving a first query for one or more three-dimensional (3D) objects; identifying at least one constraint from the first query, wherein the at least one constraint comprises a particular descriptor that specifies one or more aspects of matching 3D objects; generating a second query comprising a set of descriptors, the set of descriptors comprising the particular descriptor; performing a search, using the second query, of a data repository comprising 3D content, to obtain one or more 3D object search results having features responsive to the first query; and outputting a response to the first query that comprises the one or more 3D object search results.

Various implementations of the system are described herein.

In some implementations, the identifying the at least one constraint from the first query comprises: parsing the first query to extract the particular descriptor; and determining the one or more aspects specified by the particular descriptor.

In some implementations, the operations further comprise: calculating a fitness score of the one or more 3D object search results, individually, by: computing a similarity, on an aspect-by-aspect basis, between features of the one or more 3D object search results and the set of descriptors; and summing the similarity computed between the features of the one or more 3D object search results and the set of descriptors, for the one or more 3D object search results.

In some implementations, the operations further comprise: receiving input indicative of weight of individual aspects of the one or more aspects; and calculating a fitness score of a particular search result from the one or more 3D object search results by: computing similarities, on an aspect-by-aspect basis, between features of the particular search result and the set of descriptors; multiplying the similarities by the weights of the individual aspect, providing multiplication products; and obtaining the fitness score by summing the multiplication products.

In some implementations, the outputting the response to the first query comprises: ordering the one or more 3D object search results by the respective fitness score, wherein response comprises a subset of the one or more 3D object search results.

According to another aspect, a non-transitory computer-readable medium is provided. The non-transitory computer-readable medium has instructions stored thereon that, responsive to execution by a processing device, causes the processing device to perform operations comprising: receiving a first query for one or more three-dimensional (3D) objects; identifying at least one constraint from the first query, wherein the at least one constraint comprises a particular descriptor that specifies one or more aspects of matching 3D objects; generating a second query comprising a set of descriptors, the set of descriptors comprising the particular descriptor; performing a search, using the second query, of a data repository comprising 3D content, to obtain one or more 3D object search results having features responsive to the first query; and outputting a response to the first query that comprises the one or more 3D object search results.

Various implementations of the non-transitory computer-readable medium are described herein.

In some implementations, the identifying the at least one constraint from the first query comprises: parsing the first query to extract the particular descriptor; and determining the one or more aspects specified by the particular descriptor.

In some implementations, the operations further comprise: calculating a fitness score of individual search results of the one or more 3D object search results by: computing similarities, on an aspect-by-aspect basis, between features of the individual 3D object search results and the set of descriptors; and obtaining the fitness score by summing the similarities computed between the features of the individual 3D object search results and the set of descriptors.

In some implementations, the operations further comprise: receiving input indicative of weight of individual aspects of the one or more aspects; and calculating a fitness score of a particular search result from the one or more 3D object search results by: computing similarities, on an aspect-by-aspect basis, between features of the particular search result and the set of descriptors; multiplying the similarities by the weights of the individual aspect, providing multiplication products; and obtaining the fitness score by summing the multiplication products.

In some implementations, the outputting the response to the first query comprise: ordering the one or more 3D object search results by the respective fitness score, wherein the response comprises a subset of the one or more 3D object search results.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications, and all such modifications are within the scope of this disclosure.

BRIEF DESCRIPTION OF DRAWINGS

FIG. 2 is a flowchart of an example method to provide 3D object search results in response to a query, in accordance with some implementations.

FIG. 4 is a flowchart of an example method to calculate a fitness score, in accordance with some implementations.

FIG. 5 is a flowchart of another example method to calculate a fitness score, in accordance with some implementations.

FIG. 6 is an example illustration of 3D object search results, in accordance with some implementations.

DETAILED DESCRIPTION

Figure 1:
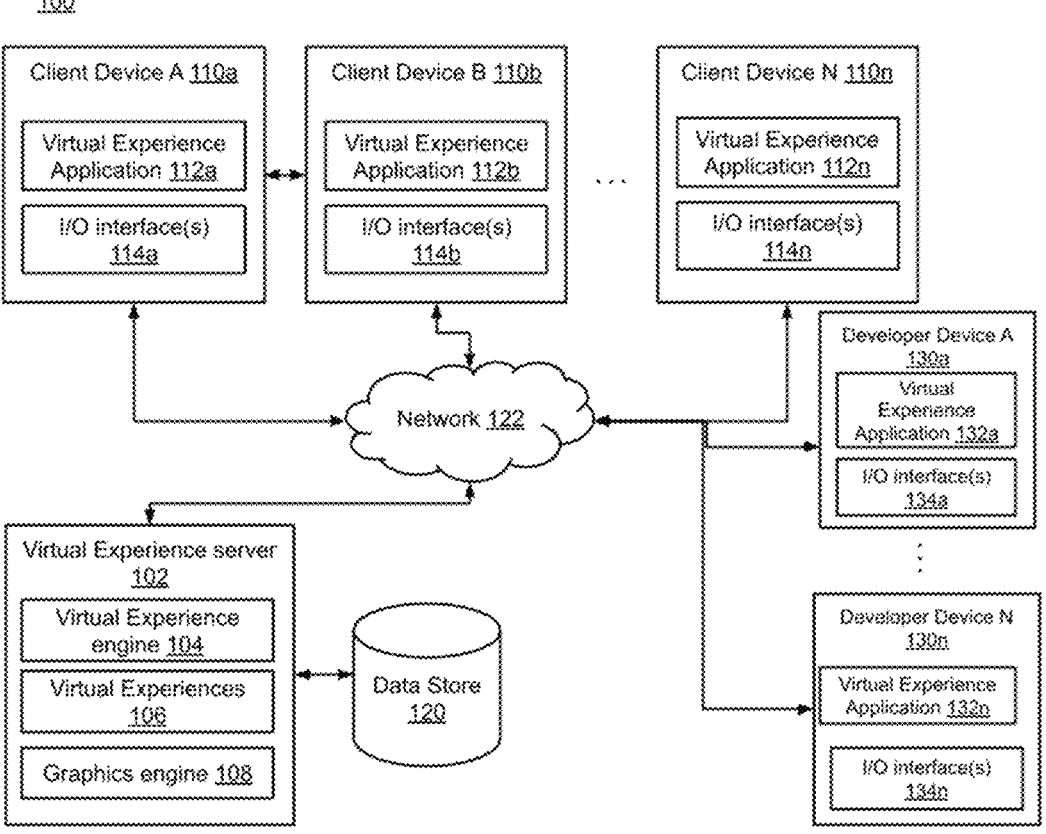
FIG. 1 is a diagram of an example system architecture for simulation of rigid body objects, in accordance with some implementations.

The described implementations allow artists and other users to search large databases of 3D content by the properties of the actual 3D objects instead of based solely on metadata. These properties include, for example: surface material, solid material, surface geometry (shape), animation rig, animation motions, physics constants, and those properties applied to subsets of the 3D content, such as the color of an avatar's hair or the coefficient of static friction between a car's tires and the ground. However, these are only example properties, and other implementations may include other properties.

In some implementations, there may be multiple stages used to perform a search. Such implementations may be applied in conjunction with traditional text metadata search elements and image search elements. Some implementations may be applied independently as a standalone query. The input to the implementations may be, for example, a text query. The output may be a ranked set of results augmented with confidence and justification information. For example, the first stage may a parsing stage including parsing the text query into a form that can be applied to the database (i.e., subqueries). The second stage may be a discovery stage that provides a set of parallel operations for performing those subqueries. The third stage may be a reporting stage that combines the results into formatted output, including the justifications.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations," "an implementation," "an example implementation," etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

FIG. 1—System Architecture

FIG. 1 is a diagram of an example system architecture for simulation of rigid body objects, in accordance with some implementations. FIG. 1 and the other figures use like reference numerals to identify similar elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110*a*," "110*b*," and/or "110*n*" in the figures).

The system architecture 100 (also referred to as "system" herein) includes online gaming server 102, data store 120, client devices 110*a*, 110*b*, and 110*n* (generally referred to as "client device(s) 110" herein), and developer devices 130*a* and 130*n* (generally referred to as "developer device(s) 130" herein). Gaming server 102, data store 120, client devices 110, and developer devices 130 are coupled via network 122. In some implementations, client devices(s) 110 and developer device(s) 130 may refer to the same or same type of device.

Online gaming server 102 can include, among other things, a game engine 104, one or more games 106, and graphics engine 108. In some implementations, the graphics engine 108 may be a system, application, or module that permits the online gaming server 102 to provide graphics and animation capability. In some implementations, the graphics engine 108 may perform one or more of the operations described below in connection with the flowchart illustrated in FIGS. 2-5. A client device 110 can include a game application 112, and input/output (I/O) interfaces 114 (e.g., input/output devices). The input/output devices can include one or more of a microphone, speakers, headphones, display device, mouse, keyboard, game controller, touchscreen, virtual reality consoles, etc.

A developer device 130 can include a game application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer-readable memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers). In some implementations, data store 120 may include cloud-based storage.

In some implementations, the online gaming server 102 can include a server having one or more computing devices (e.g., a cloud computing system, a rackmount server, a server computer, cluster of physical servers, etc.). In some implementations, the online gaming server 102 may be an independent system, may include multiple servers, or be part of another system or server.

In some implementations, the online gaming server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming server 102 and to provide a user with access to online gaming server 102. The online gaming server 102 may also include a website (e.g., a web page) or application back-end software that may be used to provide a user with access to content provided by online gaming server 102. For example, users may access online gaming server 102 using the game application 112 on client devices 110.

In some implementations, gameplay session data are generated via online gaming server 102, game application 112, and/or game application 132, and are stored in data store 120. With permission from game players, gameplay session data may include associated metadata, e.g., game identifier(s); device data associated with the players; demographic information of the player(s); gameplay session identifier(s); chat transcripts; session start time, session end time, and session duration for each player; relative locations of participant avatar(s) within a virtual game environment; in-game purchase(s) by one or more player(s); accessories utilized by game players; etc.

In some implementations, online gaming server 102 may be a type of social network providing connections between users or a type of user-generated content system that allows users (e.g., end-users or consumers) to communicate with other users on the online gaming server 102, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). A record of some or all user communications may be stored in data store 120 or within games 106. The data store 120 may be utilized to store chat transcripts (text, audio, images, etc.) exchanged between players.

In some implementations, the chat transcripts are generated via game application 112 and/or game application 132 and are stored in data store 120. The chat transcripts may include the chat content and associated metadata, e.g., text content of chat with each message having a corresponding sender and recipient(s); message formatting (e.g., bold, italics, loud, etc.); message timestamps; relative locations of participant avatar(s) within a virtual game environment, accessories utilized by game participants, etc. In some implementations, the chat transcripts may include multilingual content, and messages in different languages from different gameplay sessions of a game may be stored in data store 120.

In some implementations, chat transcripts may be stored in the form of conversations between participants based on the timestamps. In some implementations, the chat transcripts may be stored based on the originator of the message(s).

In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming server 102 may be a virtual gaming server. For example, the gaming server may provide single-player or multiplayer games to a community of users that may access or interact with games using client devices 110 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to the interaction of one or more players using client devices (e.g., 110) within a game (e.g., 106) or the presentation of the interaction on a display or other output device (e.g., 114) of a client device 110.

In some implementations, a game 106 can include an electronic file that can be executed or loaded using software, firmware or hardware configured to present the game content (e.g., digital media item) to an entity. In some implementations, a game application 112 may be executed and a game 106 rendered in connection with a game engine 104. In some implementations, a game 106 may have a common set of rules or common goal, and the environment of a game 106 shares the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game 106 may be collectively referred to as a "world" or "gaming world" or "virtual world" or "universe" herein. An example of a world may be a 3D world of a game 106. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online gaming server 102 can host one or more games 106 and can permit users to interact with the games 106 using a game application 112 of client devices 110. Users of the online gaming server 102 may play, create, interact with, or build games 106, communicate with other users, and/or create and build objects (e.g., also referred to as "item(s)" or "game objects" or "virtual game item(s)" herein) of games 106.

For example, in generating user-generated virtual items, users may create characters, decoration for the characters, one or more virtual environments for an interactive game, or build structures used in a game 106, among others. In some implementations, users may buy, sell, or trade game virtual game objects, such as in-platform currency (e.g., virtual currency), with other users of the online gaming server 102. In some implementations, online gaming server 102 may transmit game content to game applications (e.g., 112). In some implementations, game content (also referred to as "content" herein) may refer to any data or software instructions (e.g., game objects, game, user information, video, images, commands, media item, etc.) associated with online gaming server 102 or game applications. In some implementations, game objects (e.g., also referred to as "item(s)" or "objects" or "virtual objects" or "virtual game item(s)" herein) may refer to objects that are used, created, shared or otherwise depicted in game applications 106 of the online gaming server 102 or game applications 112 of the client devices 110. For example, game objects may include a part, model, character, accessories, tools, weapons, clothing, buildings, vehicles, currency, flora, fauna, components of the aforementioned (e.g., windows of a building), and so forth.

It may be noted that the online gaming server 102 hosting games 106, is provided for purposes of illustration. In some implementations, online gaming server 102 may host one or more media items that can include communication messages from one user to one or more other users. With user permission and express user consent, the online gaming server 102 may analyze chat transcripts data to improve the game platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a game 106 may be associated with a particular user or a particular group of users (e.g., a private game), or made widely available to users with access to the online gaming server 102 (e.g., a public game). In some implementations, where online gaming server 102 associates one or more games 106 with a specific user or group of users, online gaming server 102 may associate the specific user(s) with a game 106 using user account information (e.g., a user account identifier such as username and password).

In some implementations, online gaming server 102 or client devices 110 may include a game engine 104 or game application 112. In some implementations, game engine 104 may be used for the development or execution of games 106. For example, game engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 104 may generate commands that help compute and render the game (e.g., rendering commands, collision commands, physics commands, etc.) In some implementations, game applications 112 of client devices 110, respectively, may work independently, in collaboration with game engine 104 of online gaming server 102, or a combination of both.

In some implementations, both the online gaming server 102 and client devices 110 may execute a game engine (104 and 112, respectively). The online gaming server 102 using game engine 104 may perform some or all the game engine functions (e.g., generate physics commands, rendering commands, etc.), or offload some or all the game engine functions to game engine 104 of client device 110. In some implementations, each game 106 may have a different ratio between the game engine functions that are performed on the online gaming server 102 and the game engine functions that are performed on the client devices 110. For example, the game engine 104 of the online gaming server 102 may be used to generate physics commands in cases where there is a collision between at least two game objects, while the additional game engine functionality (e.g., generate rendering commands) may be offloaded to the client device 110. In some implementations, the ratio of game engine functions performed on the online gaming server 102 and client device 110 may be changed (e.g., dynamically) based on gameplay conditions. For example, if the number of users participating in gameplay of a particular game 106 exceeds a threshold number, the online gaming server 102 may perform one or more game engine functions that were previously performed by the client devices 110.

For example, users may be playing a game 106 on client devices 110, and may send control instructions (e.g., user inputs, such as right, left, up, down, user election, or character position and velocity information, etc.) to the online gaming server 102. Subsequent to receiving control instructions from the client devices 110, the online gaming server 102 may send gameplay instructions (e.g., position and velocity information of the characters participating in the group gameplay or commands, such as rendering commands, collision commands, etc.) to the client devices 110 based on control instructions. For instance, the online gaming server 102 may perform one or more logical operations (e.g., using game engine 104) on the control instructions to generate gameplay instruction(s) for the client devices 110. In other instances, online gaming server 102 may pass one or more or the control instructions from one client device 110 to other client devices (e.g., from client device 110a to client device 110b) participating in the game 106. The client devices 110 may use the gameplay instructions and render the gameplay for presentation on the displays of client devices 110.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming server 102. In other implementations, the control instructions may be sent from a client device 110 to another client device (e.g., from client device 110b to client device 110n), where the other client device generates gameplay instructions using the local game engine 104. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that enable a client device 110 to render gameplay of a game, such as a multiplayer game. The gameplay instructions may include one or more of user input (e.g., control instructions), character position and velocity information, or commands (e.g., physics commands, rendering commands, collision commands, etc.).

In some implementations, characters (or game objects generally) are constructed from components, one or more of which may be selected by the user, that automatically join together to aid the user in editing.

In some implementations, a character is implemented as a 3D model and includes a surface representation used to draw the character (also known as a skin or mesh) and a hierarchical set of interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/type of body parts; proportion (e.g., shoulder and hip ratio); head size; etc.

One or more characters (also referred to as an "avatar" or "model" herein) may be associated with a user where the user may control the character to facilitate a user's interaction with the game 106.

In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, for some asset types, e.g., shirts, pants, etc. the online gaming platform may provide users access to simplified 3D virtual object models that are represented by a mesh of a low polygon count, e.g., between about 20 and about 30 polygons.

In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character game object (e.g., body parts, etc.) but the user may control the character (without the character game object) to facilitate the user's interaction with the game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online gaming server 102. In some implementations, creating, modifying, or customizing characters, other game objects, games 106, or game environments may be performed by a user using a I/O interface (e.g., developer interface) and with or without scripting (or with or without an application programming interface (API)). It may be noted that for purposes of illustration, characters are described as having a humanoid form. It may further be noted that characters may have any form such as a vehicle, animal, inanimate object, or other creative form.

In some implementations, the online gaming server 102 may store characters created by users in the data store 120. In some implementations, the online gaming server 102 maintains a character catalog and game catalog that may be presented to users. In some implementations, the game catalog includes images of games stored on the online gaming server 102. In addition, a user may select a character (e.g., a character created by the user or other user) from the character catalog to participate in the chosen game. The character catalog includes images of characters stored on the online gaming server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online gaming server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online gaming server 102 at any given moment. It may be noted that the number of client devices 110 is provided as illustration. In some implementations, any number of client devices 110 may be used.

In some implementations, each client device 110 may include an instance of the game application 112, respectively. In one implementation, the game application 112 may permit users to use and interact with online gaming server 102, such as control a virtual character in a virtual game hosted by online gaming server 102, or view or upload content, such as games 106, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 and allows users to interact with online gaming server 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application may be an online gaming server application for users to build, create, edit, upload content to the online gaming server 102 as well as interact with online gaming server 102 (e.g., play games 106 hosted by online gaming server 102). As such, the game application may be provided to the client device(s) 110 by the online gaming server 102. In another example, the game application may be an application that is downloaded from a server.

In some implementations, each developer device 130 may include an instance of the game application 132, respectively. In one implementation, the game application 132 may permit a developer user(s) to use and interact with online gaming server 102, such as control a virtual character in a virtual game hosted by online gaming server 102, or view or upload content, such as games 106, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to developer device 130 and allows users to interact with online gaming server 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application 132 may be an online gaming server application for users to build, create, edit, upload content to the online gaming server 102 as well as interact with online gaming server 102 (e.g., provide and/or play games 106 hosted by online gaming server 102). As such, the game application may be provided to the client device(s) 130 by the online gaming server 102. In another example, the game application 132 may be an application that is downloaded from a server. Game application 132 may be configured to interact with online gaming server 102 and obtain access to user credentials, user currency, etc. for one or more games 106 developed, hosted, or provided by a game developer.

In some implementations, a user may login to online gaming server 102 via the game application. The user may access a user account by providing user account information (e.g., username and password) where the user account is associated with one or more characters available to participate in one or more games 106 of online gaming server 102. In some implementations, with appropriate credentials, a game developer may obtain access to game virtual game objects, such as in-platform currency (e.g., virtual currency), avatars, special powers, accessories, that are owned by or associated with other users.

In general, functions described in one implementation as being performed by the online gaming server 102 can also be performed by the client device(s) 110, or a server, in other implementations if appropriate. In addition, the functionality attributed to a particular component can be performed by different or multiple components operating together. The online gaming server 102 can also be accessed as a service provided to other systems or devices through suitable application programming interfaces (APIs), and thus is not limited to use in websites.

FIG. 2—Providing 3D Object Search Results

FIG. 2 is a flowchart of an example method 200 to provide 3D object search results in response to a query, in accordance with some implementations. FIG. 2 illustrates a method 200 of providing 3D object search results in response to a query, in accordance with some implementations. For example, an example method may search repositories that store 3D objects based on properties of the 3D objects. Such searching may be performed instead of, or in some instances, in addition to, the manually entered metadata associated with the 3D content. In various implementations, the steps illustrated in FIG. 2 and described below may be performed by any of the devices, e.g., one or more of client devices 110 and/or developer devices 130 and/or virtual experience server 102, as illustrated in FIG. 1.

Method 200 may begin at block 210. At block 210, a first query may be received for one or more 3D objects. The 3D objects may be sought from a repository of 3D objects. In some implementations, the first query may be a text query. Additionally or alternatively, the first query may include text or text data, an image or images, a video or videos, a gesture or gestures, one or more 3D asset examples, or the like. Block 210 may be followed by block 220.

In some implementations, at least one constraint may be identified from the first query. The constraint may comprise a particular descriptor that may specify one or more aspects of matching 3D objects. Accordingly, at block 220, at least one constraint is identified from the first query. In some implementations, the particular descriptor specifies one or more aspects.

For example, based on a text query of "red airplane," the word "red" may be identified as a descriptor. The descriptor "red" may specify or be associated with an aspect, such as, for example, "perceptual hue" and/or more generally, "material." In some implementations, from that same query of "red airplane," the word "airplane" may be identified as a descriptor also. The descriptor "airplane" may specify (or be associated) with an aspect "semantics" and/or more generally, "geometry."

In some implementations, for example, from the text query "red airplane with spinning propeller, two boxy wings perpendicular to the fuselage, hinged rudder and flaps, opening cockpit canopy," a plurality of descriptors may be identified. For example, one or more of the words "red," "airplane," "spinning," "propeller," "boxy," "wings," "perpendicular," "fuselage," "hinged," "rudder," "flaps," "opening," "cockpit," and "canopy" may be identified as descriptors. The descriptors identified from the text query may then be associated with one or more aspects. For example, aspects may include geometry, material, articulation, Animation, and Physical Models and/or Simulation. For example, articulation could be seen as the static "pose" of a character, such as sitting or standing. Animation refers to motion, such as walking, jumping, or running, which involves a sequence of poses changing over time. Physical models means the underlying material of the object used to do a simulation, such as a rubber-like object or a stone-like rigid body object. This property is more focused on the physical properties of the material (e.g., material density) that may influence physical simulation, rather than the rendering appearance of the material (e.g., colors).

In some implementations, one or more aspects may be specified or otherwise associated with a descriptor. For example, in addition to geometry, aspects such as semantics (e.g., "airplane," "gear"), silhouette (from a viewpoint), contour (from a viewpoint), curvature statistics (e.g., "bumpy," curvature profile, "texture," surface characteristics), surface area to volume ratio (e.g., "thin"), 3D aspect ratio, and orientation (e.g., "top heavy," "balanced") may be associated with a descriptor.

Additionally or alternatively, in addition to the aspect "material," there may be aspects such as reflectivity (e.g., "dark"), microfacet roughness (e.g., "shiny"), transparency, translucency (e.g., "frosted"), perceptual hue (e.g., "red"), distribution (e.g., "mottled"), layers (e.g., "varnished"), surface material vs. solid material. Here, surface material is about material properties defined on the surface (e.g., roughness, colors, etc.). These properties often refer to properties that control a rendering appearance of a surface. Solid material is about a property that may influence physical simulations. For instance, a material density property may determine whether a material may float if thrown into water or if the material may squeeze if pressed.

Another aspect is geometry mask (also known as alpha). Alpha is related to transparency. Alpha determines the final color coming out of transparent objects overlayed with each other. Alpha is part of an algorithm called alpha blending/compositing, and that is why it is often called alpha. Alpha compositing or alpha blending is the process of combining one image with a background to create the appearance of partial or full transparency. In a 2D image, a color combination is stored for each picture element (pixel), often a combination of red, green, and blue (RGB). When alpha compositing is in use, each pixel has an additional numerical value stored in its alpha channel, with a value ranging from 0 to 1. A value of 0 means that the pixel is fully transparent and the color in the pixel beneath shows through. A value of 1 means that the pixel is fully opaque.

Another aspect is non-physical image maps, such as ambient occlusion maps. Ambient occlusion is a quantity that measures visibility of a specific location on a shape. For example, when looking at a paper bag model, an exterior location on the paper bag has high visibility because it is visible from many angles when viewed it from the outside. In contrast, a location inside the bag has low visibility. Ambient occlusion is a quantity that tries to approximate such visibility by considering the possibility that this point is visible from all possible viewing directions.

In some implementations, a normal map/bump map/displacement map "material" property of a 3D asset may be handled in the geometry aspect, not the "material" aspect. One example would be the material roughness. One way to have a rough surface is to have a roughness parameter that controls how light reflects from the surface when an object is rendered. When there is a smooth surface with a high roughness parameter, the rendered image may still look like a rough material. Equivalently, there may not be a roughness parameter and it may be assumed that all materials reflect lighting like a metal. However, it may still be possible to have a rendering algorithm imitate the appearance of a rough surface by making the surface normal of the mesh noisy with a normal map, so the surface actually reflects randomly like a rough material.

Additionally or alternatively, in addition to the aspect "articulation," there may be aspects such as joints, bones, and related articulations (collectively referred to as "joints" from here on), hinge, ball and socket, universal, slider, and 6-degree of freedom or "free" joints. This approach generalizes to all SE3 joints, where SE3 joints represent a joint that can rotate and translate, providing skeletal hierarchy (e.g., joint bone connectivity, along with geometry the joints affect), Skinning, deformation cages, and skinning/blend weights associated with rig and skinning—usually encapsulated in UV texturing images (collectively called "skinning" from here on). For example, such UV texturing images may be a part of UV mapping. UV mapping is a 3D modeling process of projecting a 3D object's surface to a 2D image for texture mapping. This 2D image for the texture mapping uses UV coordinates, which are commonly known as texture coordinates. U represents the horizontal axis and V represents the vertical axis. U and V are used in this context because the letters W, X, Y, and Z have other common uses in computer graphics.

Additionally or alternatively, in addition to the aspect "animation," there may be aspects such as animations or animation policies available as part of the 3D asset that apply to the articulation, joint trajectories from motion capture (mocap) and/or animation curves, keyframe anima-tion described with key values, and blend transitions, and reduced model spaces, e.g. for deformable animation, latent space and similar data for control vector trajectories of said latent spaces. The term latent space often refers to a black-box representation (e.g., a list of numbers) that an AI model uses to understand and control the output. Taking character animation as an example, an AI model may turn a first list of numbers into trajectories of a running animation, a second list of numbers into trajectories of a flying animation, and a third list of numbers into trajectories of a jogging animation. In this case, because jogging and running are more similar, the first list of numbers and the third list of numbers may be closer to one another by comparison to the second one. Thus, the similarity in the latent space (list(s) of numbers) could also be content for doing a search.

Additionally or alternatively, in addition to the aspect "physical models/simulation," there may be aspects such as dynamics specifications including one or more of mass, inertia, connection graph, and positions; physical properties including one or more of stiffness, damping, density, elasticity modulus, friction, adhesion/unilateral constraints; physical constraints including joint ranges, muscle and/or motor/torque limits; and controllers and/or state-action (RL) policies. For example, the AI model in the above example that controls the trajectories of a character animation is often called a controller because it controls the character. State-action policies refer to the function(s) that take a list of numbers in the latent space (state) as input and outputs a trajectory (action) of the character animation. Such functions (that map a list of numbers/states to a trajectory/action) are called policies.

In the example introduced above, "red airplane with spinning propeller, two boxy wings perpendicular to the fuselage, hinged rudder and flaps, opening cockpit canopy," one or more descriptors may be identified, and, in some implementations, associated or specified, such as for example: "red" associated with, for example, aspects such as "material" and/or "hue (surface)," "spinning" associated with, for example, aspects such as "articulation," "joint type," and/or "geometry affected," "boxy" associated with, for example, aspects such as "geometry" and/or "curvature, surface normal," "perpendicular" associated with, for example, aspects such as "geometry" and/or "orientation," "hinged," associated with, for example, aspects such as "articulation" and/or "joint type=Hinge," and "Opening" associated with, for example, aspects such as "Articulation." Block 220 may be followed by block 230.

At block 230, a second query may be generated, the second query including a set of descriptors. The set of descriptors may include the particular descriptor. For example, in the example above, the second query may comprise one or more of "red," "spinning," "boxy," "perpendicular," "hinged," and/or "opening." Block 230 may be followed by block 240.

At block 240, a search, using the second query, of a data repository including 3D content (such as a plurality of 3D objects), may be performed to obtain one or more 3D object search results having features responsive to the first query. The second query may employ a multidimensional search that compares, for example, one or more descriptors to the repository. Given one or more of the descriptors, or more generally, keywords (or other information used as part of the second query), one or more 3D object search results may be identified using various processes for identifying properties of 3D shapes without metadata. For example, a global shape appearance or local shape appearance may be represented as fixed-size vectors for comparison purposes. In some instances, machine learning (ML) techniques may be used to encode the rendered appearances. The ML techniques may include an image embedding model that turns an image into a list of numbers (again a black box representation in the latent space). However, there are training methods to make sure that these lists of numbers are meaningful, e.g., similar images result in similar numbers. Common models for this purpose may include neural networks that learn visual concepts.

More specifically, for example, there may be a process for generating a 3D object from text (e.g., "an airplane") with which, for example, any of various known processes may be used to compare that 3D object (e.g., the generated airplane) to those 3D objects stored in the data repository. For example, in some implementations, a similarity between the shape, for example, of the generated 3D object with spherical harmonic descriptors may be determined. Additionally or alternatively, in some implementations, a similarity between the shape with popular geometric distances may be determined.

For example, this process describes one way to retrieve a 3D object using the following steps. First, a user inputs a textual input to a text-to-3D AI model. Second, the AI model outputs a 3D mesh. Third, the shape similarity between the model generated from the AI model against all the meshes in the repository is measured. The examples (e.g., spherical harmonics) are example ways to measure the shape similarity.

In some implementations, the descriptor further specifies or is further associated with a region. In some implementations, the region limits the descriptor to a particular aspect within the region (e.g., to a subset of the 3D object). For example, in "boxy wings," the word "wings" is identified as being associated with a wing region and only applies "boxy" to the geometry aspect within that region. Any descriptor that does not associate to a region may apply, or be associated, to the entire 3D object.

In some implementations, regions may be considered at least one of a spatial descriptor and a semantic descriptor. Spatial descriptors may describe a volume of space relative to a bounding volume, convex hull, or surface, such as "top," "bottom," "outside," "inside," "left side," "front," etc. of a 3D object. That is, in some implementations, the region describes a volume of space relative to a bounding volume, a convex hull, or surface of a model.

Additionally or alternatively, in some implementations, for example, region, as a semantic descriptor, may describe areas that themselves are identified by a Geometry and Material aspect match, such as "hair," "wings," "tail," "wheels," and "windshield." As such, in some implementations, the region describes an area of the 3D content. Block 240 may be followed by block 250. Block 250 may correspond to the beginning of a Discovery Stage.

At block 250, input may be received indicative of a weight of an individual aspect of the one or more aspects. For example, because a weight of individual aspect similarity may influence the final fitness score, users may be provided a means by which to adjust the weights. For example, by receiving additional text, such as "give me the chair with exactly the same color as this image" provided with an image of a chair of a certain color, the process may weight similarity in color more than other similarities. Block 250 may be followed by block 260.

At block 260, a fitness score of one or more particular search results from the one or more 3D object search results may be calculated. In some implementations, the fitness score is calculated from the one or more 3D object search results. For example, the fitness score may be based on a sum or a weighted sum of similarities between features of the one or more 3D object search results and the set of descriptors. Such similarities may be found on an aspect-by-aspect basis. FIGS. 4 and 5 illustrate exemplary methods of calculating a fitness score. Block 260 may be followed by block 270. Block 270 may correspond to a Reporting Stage.

At block 270, a response to the first query may be output that comprises the one or more 3D object search results. In some implementations, the one or more 3D object search results include one or more features responsive to the first query. In some implementations, the response comprises a subset of the one or more 3D object search results.

In some implementations, the one or more 3D object search results included in the output may be ordered, for example, by fitness score. Alternatively, an ordering may be from highest to lowest. In some implementations, there may an instance in which the output comprises a subset of the one or more 3D object search results, from highest to, for example, the lowest fitness score that may meet a predefined threshold, or alternatively, to a predefined $n^{th}$ highest fitness score (e.g., the top 10 3D object search results are provided ordered from highest to $10^{th}$ highest fitness score). As discussed, the fitness score may be a number derived from different ways of doing the 3D search (e.g., from metadata or from shape similarities). As noted, these various techniques provide different ways to display the data, as other products use different way to effectively display related search results to a user.

Figure 3:
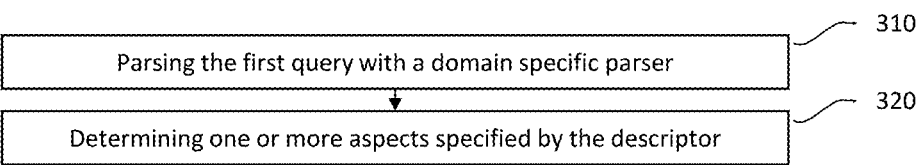
FIG. 3 is a flowchart of an example method to identify descriptors from input data, in accordance with some implementations.

FIG. 3—Identifying Descriptors From Input Data

FIG. 3 is a flowchart of an example method 300 to identify descriptors from input data, in accordance with some implementations. FIG. 3 illustrates a method 300 of identifying one or more descriptors from, for example, the first query, in accordance with one or more implementations. In various implementations, the steps illustrated in FIG. 3 and described below may be performed by any of the elements illustrated in FIG. 1.

Method 300 may begin at block 310. At block 310, the first query may be parsed by, for example, a domain specific parser. For example, text input may be parsed by a text-specific parser, an image that may be input may be parsed by an image-specific parser, and a video that may be input may be parsed by a video-specific parser. However, in some implementations, the first query may be parsed by a generic parser, a multi-purpose parser or a general-purpose parser. Block 310 may be followed by block 320.

At block 320, one or more aspects specified by the descriptor may be determined. For example, as described above, in the text input "red airplane with boxy wings," "boxy" may be identified as a descriptor and then be associated with, for example, aspects such as "geometry" and/or "curvature, surface normal."

Semantic regions can be dynamically identified during the query. However, they are expensive to identify at query time. This process can be accelerated by preprocessing the model to label potential semantic regions. That labeling is automated but can be augmented by manual identifications of geometry, materials, or regions. It is a normal part of the 3D authoring process for creators to perform this labeling. For example, a 3D model of an airplane is usually represented within a 3D modeling program as a tree of geometry nodes, each of which has a name. Those names can be directly taken as semantic hints for fuzzy text matching to define semantic regions. Likewise, models intended for interactive applications often have "hitboxes" that define volumes containing subsets of the geometry, such as "leg."

FIG. 4—Calculating a Fitness Score

FIG. 4 is a flowchart of an example method 400 to calculate a fitness score, in accordance with some implementations. FIG. 4 illustrates a method 400 of calculating a fitness score of the one or more 3D object search results, individually, in accordance with an implementation. In various implementations, the steps illustrated in FIG. 4 and described below may be performed by any of the elements illustrated in FIG. 1.

Method 400 may begin at block 410. At block 410, similarities may be computed, on an aspect-by-aspect basis, between features of the one or more 3D object search results and the set of descriptors. For example, as described above, similarities between 3D objects, such as that described by the query and those of the 3D object repository, may be computed based on similarities between the shapes with spherical harmonic descriptors or with popular geometric distances. In some implementations, similarities between shape semantics with AI recognition models may be determined. Additionally or alternatively, silhouette similarities with sketch-based 3D search methods may be determined. Other similarities may be computed for individual aspects, using additional techniques instead of or in addition to these examples. Block 410 may be followed by block 420.

After computing similarities for individual aspects, a final fitness score may be determined by calculating a sum of the similarities of the individual aspects. As such, at block 420, the fitness score is obtained by summing the similarities computed between the features of the individual 3D object search results and the set of descriptors. In some implementations the sum is a weighted sum. In some implementations, multiplication products resulting from the multiplication of a $n^{th}$ similarity being multiplied by a $n^{th}$ weight associated with a $n^{th}$ individual aspect may be summed. In some implementations, the sum may become the final fitness score. In some implementations, additional operations may be performed on the sum, such as normalizing or scaling operations. Block 420 may be followed by block 430.

At block 430, the one or more 3D object search results may be ordered by the respective fitness score. In some implementations, the response may include a subset of the one or more 3D object search results, ordered by respective fitness score.

In some implementations, to report the result of the search simply acts to sort the fitness scores and report the ones with the highest scores. As the weight of individual aspect similarity influences the final fitness score, an important part of fine tuning the search is to provide users ways to adjust the weights. For instance, by providing an additional text input of "give me the chair with exactly the same color as this image" and providing an image, the method may prioritize and/or focus more on the similarities in color. These options for adjusting the weights may be important for a user to fine-tune their searches in order to narrow down a search to a specific model the user is looking for in a dataset with a large number (such as millions) of 3D models.

FIG. 5—Calculating Fitness Score

FIG. 5 is a flowchart of another example method 500 to calculate a fitness score, in accordance with some implementations. FIG. 5 illustrates a second exemplary method 500 of calculating a fitness score of the one or more 3D object search results, individually, in accordance with an implementation. In various implementations, the steps illustrated in FIG. 5 and described below may be performed by any of the elements illustrated in FIG. 1.

Method 500 may begin at block 510. For example, method 500 calculates a fitness score of a particular search result. At block 510, similarities may be computed, on an aspect-by-aspect basis, between features of the particular search result and the set of descriptors. For example, as described above, similarities between 3D objects, such as that described by the query and those of the 3D object repository, may be computed. For example, similarities may be computed based on the shape with spherical harmonic descriptors or with popular geometric distances. In some implementations, similarities between shape semantics with AI recognition models may be determined. Additionally or alternatively, silhouette similarities with sketch-based 3D search methods may be determined. Block 510 may be followed by block 520.

After computing similarities for individual aspects, a final fitness score may be determined by taking a weighted sum of the computed similarities. Accordingly, at block 520, the similarities may then be multiplied by the weights of individual aspects, providing the multiplication products. The multiplication products are terms for the weighted sum. Block 520 may be followed by block 530.

At block 530, the fitness score may be obtained by summing the multiplication products. In some implementations, multiplication products resulting from, for example, the multiplication of a $n^{th}$ similarity being multiplied by a $n^{th}$ weight associated with a $n^{th}$ individual aspect may be summed. Block 530 may be followed by block 540.

At block 540, the one or more 3D object search results may be ordered by the respective fitness score. In some implementations, the response comprises a subset of the one or more 3D object search results, ordered by fitness score. For example, FIG. 6 illustrates three 3D object search results that, for example, may be ordered by fitness scores. That is, because the top 3D object search result is of an airplane comprising boxy wings and a propeller, the fitness score may be the highest of the 3D object search results. The middle 3D object search result has no propeller, and the bottom 3D object search result has no propeller and does not have boxy wing. In some implementations, while many other 3D object search results may have been identified, associated fitness scores did not warrant inclusion in the displayed 3D object search results.

FIG. 6—Example Images

FIG. 6 is an example illustration of 3D object search results 600, in accordance with some implementations. In one exemplary implementation, FIG. 6 illustrates three 3D object search results that, for example, may be ordered by fitness scores. That is, because the top 3D object search result is of an airplane comprising boxy wings and a propeller, the fitness score may be the highest of the 3D object search results. The middle 3D object search result has no propeller, and the bottom 3D object search result has no propeller and does not have boxy wings. In some implementations, while many other 3D object search results may have been identified, associated fitness scores did not warrant inclusion in the displayed 3D object search results.

Figure 7:
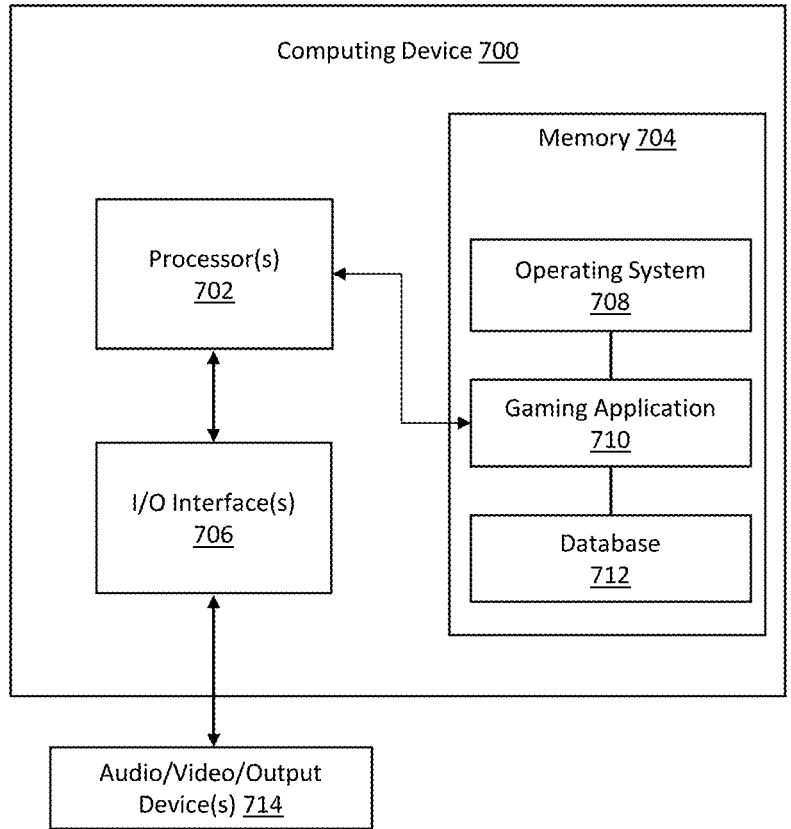
FIG. 7 is a block diagram that illustrates an example computing device, in accordance with some implementations.

FIG. 7—Computing Device

FIG. 7 is a block diagram of an example computing device 700 which may be used to implement one or more features described herein. In one example, device 700 may be used to implement a computer device (e.g., 102 and/or 110 of FIG. 1), and perform appropriate method implementations described herein. Computing device 700 can be any suitable computer system, server, or other electronic or hardware device. For example, the computing device 700 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 700 includes a processor 702, a memory 704, input/output (I/O) interface 706, and audio/video input/output devices 714.

Processor 702 can be one or more processors and/or processing circuits to execute program code and control basic operations of the device 700. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 704 is typically provided in device 700 for access by the processor 702 and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 702 and/or integrated therewith. Memory 704 can store software operating on the server device 700 by the processor 702, including an operating system 708, one or more applications 710, e.g., gaming applications 710, and database 712. In some implementations, application 710 can include instructions that enable processor 702 to perform the functions (or control the functions of) described herein, e.g., some or all of the methods described with respect to FIGS. 2-5.

For example, applications 710 can include a database 712, which as described herein can provide storage for 3D content within an online gaming server (e.g., 102). Elements of software in memory 704 can alternatively be stored on any other suitable storage location or computer-readable medium. In addition, memory 704 (and/or other connected storage device(s)) can store instructions and data used in the features described herein. Memory 704 and any other type of storage (magnetic disk, optical disk, magnetic tape, or other tangible media) can be considered "storage" or "storage devices."

I/O interface 706 can provide functions to enable interfacing the server device 700 with other systems and devices. For example, network communication devices, storage devices (e.g., memory and/or data store 120), and input/output devices can communicate via interface 706. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 714 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 7 shows one block for each of processor 702, memory 704, I/O interface 706, and software blocks of operating system 708 and application 710. These blocks may represent one or more processors or processing circuitries, operating systems, memories, I/O interfaces, applications, and/or software engines. In other implementations, device 700 may not have all of the components shown and/or may have other elements including other types of elements instead of, or in addition to, those shown herein. While the online gaming server 102 is described as performing operations as described in some implementations herein, any suitable component or combination of components of online gaming server 102 or similar system, or any suitable processor or processors associated with such a system, may perform the operations described.

A user device can also implement and/or be used with features described herein. Example user devices can be computer devices including some similar components as the device 700, e.g., processor(s) 702, memory 704, and I/O interface 706. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 714, for example, can be connected to (or included in) the device 700 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 200, 300, 400, and/or 500) can be implemented by computer program instructions or code, which can be executed on a computer. For example, the code can be implemented by one or more digital processors (e.g., microprocessors or other processing circuitry), and can be stored on a computer program product including a non-transitory computer-readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method comprising:
   receiving a first query for one or more three-dimensional (3D) objects;
   identifying at least one constraint from the first query, wherein the at least one constraint comprises a particular descriptor that specifies one or more aspects of matching 3D objects;
   generating a second query comprising a set of descriptors identified by associating the first query with the one or more aspects of the matching 3D objects, the set of descriptors comprising the particular descriptor, wherein the one or more aspects specified by the particular descriptor include a region, wherein the region is a semantic region of a 3D object and the 3D object is divided into semantic regions associated with geometric node names during a preprocessing operation, wherein the geometric node names are used as semantic hints for fuzzy text matching to define the semantic regions, and wherein each descriptor in the set of descriptors comprises text;
   performing a multidimensional search, using the second query, of a data repository comprising 3D content, to obtain one or more 3D object search results having features that correspond to the at least one constraint identified from the first query, wherein performing the multidimensional search comprises:

generating a plurality of 3D meshes by applying a text-to-3D artificial intelligence (AI) model to the text within respective descriptors from the set of descriptors; and
   comparing the plurality of 3D meshes with representations of the 3D content in the data repository to identify the one or more 3D object search results based on shape similarities determined with spherical harmonic descriptors or silhouette similarities determined with sketch-based 3D search methods, the shape similarities or silhouette similarities being determined between at least one of the plurality of 3D meshes and the one or more 3D object search results by representing a global shape appearance, a local shape appearance, or a combination thereof of the plurality of 3D meshes as one or more fixed-size vectors by using machine learning (ML) techniques to encode at least one of the shape appearances using an image embedding model to transform images corresponding to the at least one of the shape appearances into a list of numbers, wherein the ML techniques include neural networks trained to represent similar images as similar numbers;
   outputting a response to the first query that comprises the one or more 3D object search results; and
   fine-tuning the one or more 3D object search results based on received weights to narrow down the one or more 3D object search results to a specific 3D model being sought by the first query.

2. The computer-implemented method of claim 1, wherein the identifying the at least one constraint from the first query comprises:
   parsing the first query using a domain-specific parser to extract the particular descriptor; and
   determining the one or more aspects specified in the particular descriptor.

3. The computer-implemented method of claim 1, wherein the one or more aspects specified in the particular descriptor further include one or more of geometry, material, articulation, animation, or at least one of physical models or simulation.

4. The computer-implemented method of claim 1, wherein the shape similarities are further determined using shape semantics with artificial intelligence (AI) recognition models.

5. The computer-implemented method of claim 1, further comprising:
   calculating a fitness score of individual search results of the one or more 3D object search results by:
      computing similarities, on an aspect-by-aspect basis, between features of the individual search results and the set of descriptors; and
      obtaining the fitness score by summing the similarities computed between the features of the individual search results and the set of descriptors.

6. The computer-implemented method of claim 1, further comprising:
   receiving input indicative of aspect weights of individual aspects of the one or more aspects; and
   calculating a fitness score of a particular search result from the one or more 3D object search results by:
      computing similarities, on an aspect-by-aspect basis, between features of the particular search result and the set of descriptors;
      multiplying the similarities by the aspect weights of the individual aspects, providing multiplication products; and obtaining the fitness score by summing the multiplication products.

7. The computer-implemented method of claim 6, wherein the outputting the response to the first query comprises:

ordering the one or more 3D object search results by the respective fitness scores, wherein the response comprises a subset of the one or more 3D object search results.

8. The system of claim 7, wherein the shape similarities are further determined using shape semantics with artificial intelligence (AI) recognition models.

9. A system comprising:

a memory with instructions stored thereon; and a processing device, coupled to the memory, the processing device configured to access the memory and execute the instructions, wherein the instructions cause the processing device to perform operations comprising:

receiving a first query for one or more three-dimensional (3D) objects;

identifying at least one constraint from the first query, wherein the at least one constraint comprises a particular descriptor that specifies one or more aspects of matching 3D objects;

generating a second query comprising a set of descriptors identified by associating the first query with the one or more aspects of the matching 3D objects, the set of descriptors comprising the particular descriptor, wherein the one or more aspects specified by the particular descriptor include a region, wherein the region is a semantic region of a 3D object and the 3D object is divided into semantic regions associated with geometric node names during a preprocessing operation, wherein the geometric node names are used as semantic hints for fuzzy text matching to define the semantic regions, and wherein each descriptor in the set of descriptors comprises text;

performing a multidimensional search, using the second query, of a data repository comprising 3D content, to obtain one or more 3D object search results having features that correspond to the at least one constraint identified from the first query, wherein performing the multidimensional search comprises:

generating a plurality of 3D meshes by applying a text-to-3D artificial intelligence (AI) model to the text within respective descriptors from the set of descriptors; and comparing the plurality of 3D meshes with representations of the 3D content in the data repository to identify the one or more 3D object search results based on shape similarities determined with spherical harmonic descriptors or silhouette similarities determined with sketch-based 3D search methods, the shape similarities or silhouette similarities being determined between at least one of the plurality of 3D meshes and the one or more 3D object search results by representing a global shape appearance, a local shape appearance, or a combination thereof of the plurality of 3D meshes as one or more fixed-size vectors by using machine learning (ML) techniques to encode at least one of the shape appearances using an image embedding model to transform images corresponding to the at least one of the shape appearances into a list of numbers, wherein the ML techniques include neural networks trained to represent similar images as similar numbers;

outputting a response to the first query that comprises the one or more 3D object search results; and fine-tuning the one or more 3D object search results based on received weights to narrow down the one or more 3D object search results to a specific 3D model being sought by the first query.

10. The system of claim 9, wherein identifying the at least one constraint from the first query comprises:

parsing the first query using a domain-specific parser to extract the particular descriptor; and determining the one or more aspects specified by the particular descriptor.

11. The system of claim 9, wherein the instructions further cause the processing device to perform operations comprising:

calculating a fitness score of individual search results of the one or more 3D object search results by:

computing similarities, on an aspect-by-aspect basis, between features of the individual search results and the set of descriptors; and obtaining the fitness score by summing the similarities computed between the features of the individual search results and the set of descriptors.

12. The system of claim 9, wherein the instructions further cause the processing device to perform operations comprising:

receiving input indicative of aspect weights of individual aspects of the one or more aspects; and calculating a fitness score of a particular search result from the one or more 3D object search results by:

computing similarities, on an aspect-by-aspect basis, between features of the particular search result and the set of descriptors;

multiplying the similarities by the aspect weights of the individual aspects, providing multiplication products; and obtaining the fitness score by summing the multiplication products.

13. The system of claim 12, wherein the outputting the response to the first query comprises:

ordering the one or more 3D object search results by the respective fitness scores, wherein the response comprises a subset of the one or more 3D object search results.

14. The system of claim 9, wherein the one or more aspects specified in the particular descriptor further include one or more of geometry, material, articulation, animation, or at least one of physical models or simulation.

15. A non-transitory computer-readable medium with instructions stored thereon that, responsive to execution by a processing device, cause the processing device to perform operations comprising:

receiving a first query for one or more three-dimensional (3D) objects;

identifying at least one constraint from the first query, wherein the at least one constraint comprises a particular descriptor that specifies one or more aspects of matching 3D objects;

generating a second query comprising a set of descriptors identified by associating the first query with the one or more aspects of the matching 3D objects, the set of descriptors comprising the particular descriptor, wherein the one or more aspects specified by the particular descriptor include a region, wherein the region is a semantic region of a 3D object and the 3D object is divided into semantic regions associated with geometric node names during a preprocessing operation, wherein the geometric node names are used as semantic hints for fuzzy text matching to define the semantic regions, and wherein each descriptor in the set of descriptors comprises text;

performing a multidimensional search, using the second query, of a data repository comprising 3D content, to obtain one or more 3D object search results having features that correspond to the at least one constraint identified from the first query, wherein performing the multidimensional search comprises:

generating a plurality of 3D meshes by applying a text-to-3D artificial intelligence (AI) model to the text within respective descriptors from the set of descriptors; and comparing the plurality of 3D meshes with representations of the 3D content in the data repository to identify the one or more 3D object search results based on shape similarities determined with spherical harmonic descriptors or silhouette similarities determined with sketch-based 3D search methods, the shape similarities or silhouette similarities being determined between at least one of the plurality of 3D meshes and the one or more 3D object search results by representing a global shape appearance, a local shape appearance, or a combination thereof of the plurality of 3D meshes as one or more fixed-size vectors by using machine learning (ML) techniques to encode at least one of the shape appearances using an image embedding model to transform images corresponding to the at least one of the shape appearances into a list of numbers, wherein the ML techniques include neural networks trained to represent similar images as similar numbers;

outputting a response to the first query that comprises the one or more 3D object search results; and fine-tuning the one or more 3D object search results based on received weights to narrow down the one or more 3D object search results to a specific 3D model being sought by the first query.

16. The non-transitory computer-readable medium of claim 15, wherein the identifying the at least one constraint from the first query comprises:

parsing the first query using a domain-specific parser to extract the particular descriptor; and determining the one or more aspects specified in the particular descriptor.

17. The non-transitory computer-readable medium of claim 15, wherein the operations further comprises:

calculating a fitness score of individual search results of the one or more 3D object search results by:

computing similarities, on an aspect-by-aspect basis, between features of the individual search results and the set of descriptors; and obtaining the fitness score by summing the similarities computed between the features of the individual search results and the set of descriptors.

18. The non-transitory computer-readable medium of claim 15, wherein the operations further comprises:

receiving input indicative of aspect weights of individual aspects of the one or more aspects; and calculating a fitness score of a particular search result from the one or more 3D object search results by:

computing similarities, on an aspect-by-aspect basis, between features of the particular search result and the set of descriptors;

multiplying the similarities by the aspect weights of the individual aspects, providing multiplication products; and obtaining the fitness score by summing the multiplication products.

19. The non-transitory computer-readable medium of claim 18, wherein the outputting the response to the first query comprises:

ordering the one or more 3D object search results by the respective fitness scores, wherein the response comprises a subset of the one or more 3D object search results.

20. The non-transitory computer-readable medium of claim 15, wherein the shape similarities are further determined using shape semantics with artificial intelligence (AI) recognition models.

* * * * *